Nov. 25, 1958  C. R. RASMUSSEN ET AL  2,861,676
RECIPROCABLE FEED MECHANISM FOR ADVANCING ARTICLES STEP BY STEP
Filed Oct. 28, 1954  3 Sheets-Sheet 1
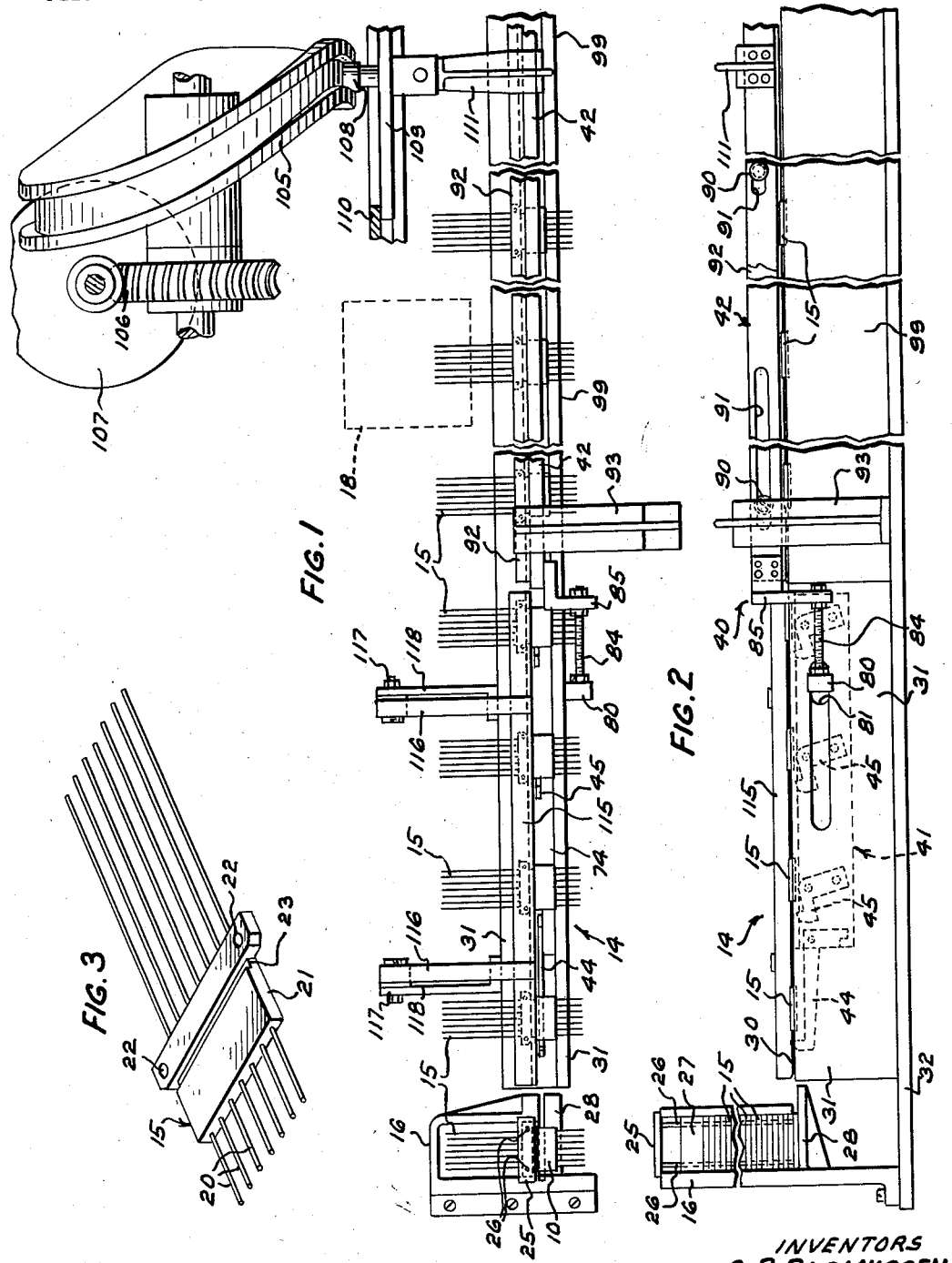
INVENTORS
C. R. RASMUSSEN
J. W. RICE
BY C. B. Hamilton
ATTORNEY

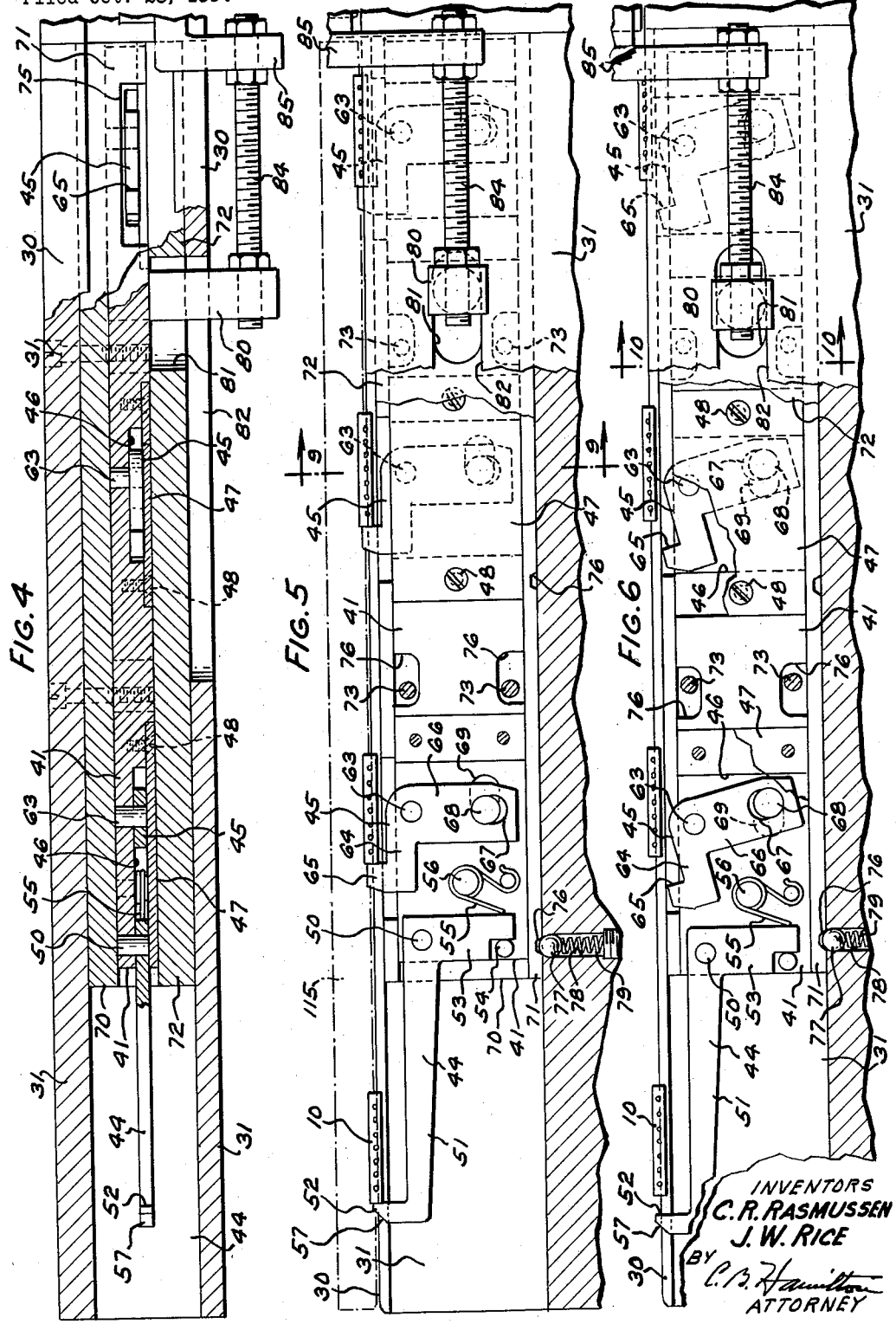

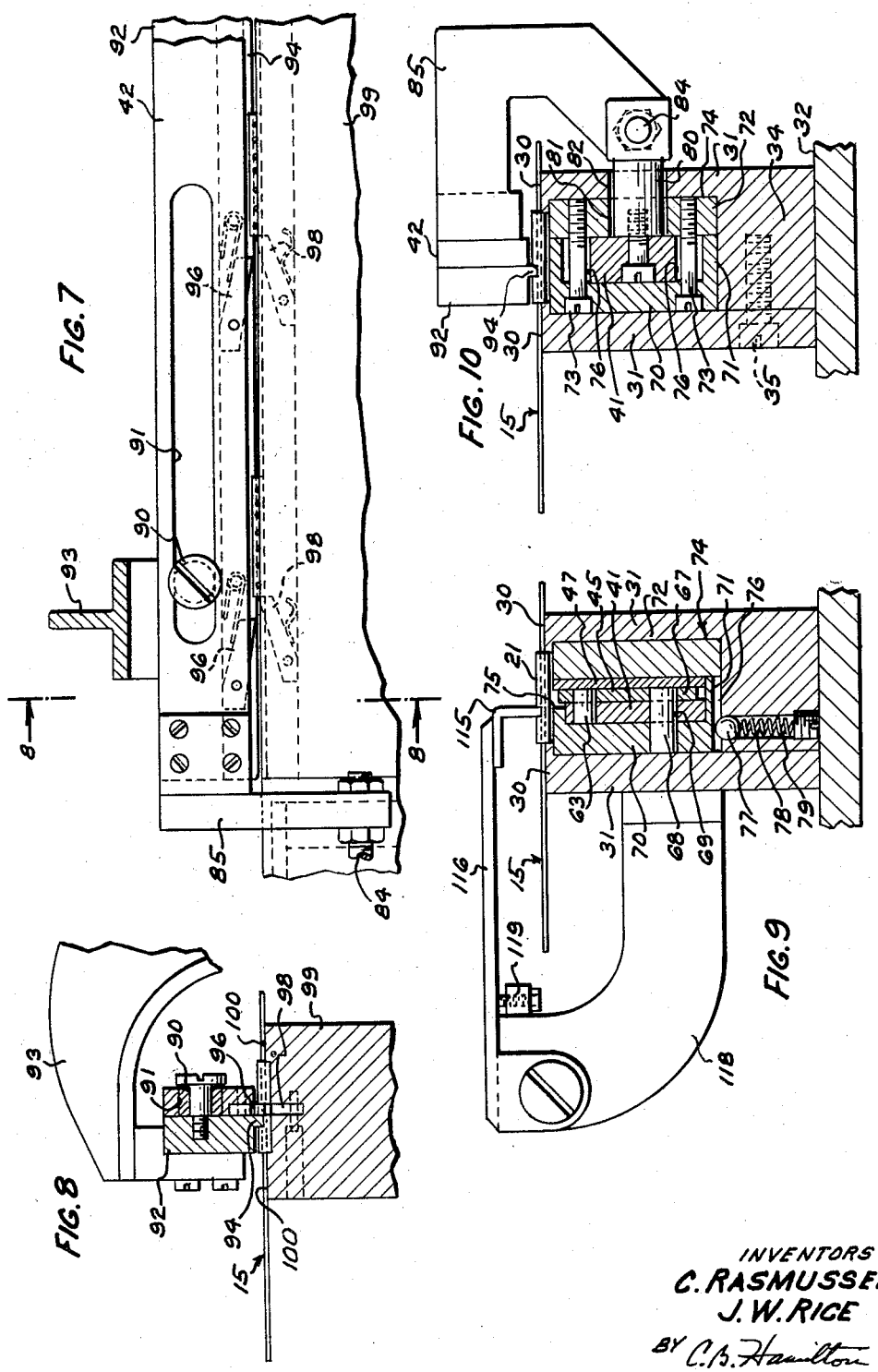

United States Patent Office 2,861,676
Patented Nov. 25, 1958

2,861,676

RECIPROCABLE FEED MECHANISM FOR ADVANCING ARTICLES STEP BY STEP

Clarence R. Rasmussen, La Grange, and James W. Rice, Hinsdale, Ill., assignors to Western Electric Company, Incorporated, New York, N. Y., a corporation of New York Application October 28, 1954, Serial No. 465,276

8 Claims. (Cl. 198—218)

This invention relates to an intermittently operable article feeding mechanism and more particularly to a feed mechanism for removing successive articles from a magazine and advancing them step by step to a work station.

It is an object of the invention to provide an improved feed mechanism for advancing articles step by step.

Another object of the invention is to provide a reciprocable feed mechanism for removing articles from a magazine and advancing them step by step to a work station.

A feed mechanism illustrating certain features of the invention may include a pair of rails for supporting articles thereon for step by step movement to a work station, and a feed bar reciprocable through a predetermined distance and having a plurality of spaced pawls mounted thereon for movement to and from upper and lower positions. An element pivotally connected to the feed pawls is movable with and relative to the feed bar and is operable in response to the initial portion of the movement of the feed bar in a forward direction for moving the pawls to their upper operative positions to engage and advance the articles step by step with the feed bar, and the element is operable in response to the initial portion of the movement of the feed bar in a reverse direction for moving the pawls to their lower positions whereby during the return stroke of the feed bar the pawls are moved below the articles on the rails. A magazine is provided for supporting a stack of the articles, and a pawl on one end of the feed bar is adapted to engage the lowermost article of the stack and transfer it from the magazine onto the rails in a position to be advanced step by step by the feeding mechanism.

Other objects and advantages of the invention will become apparent by reference to the following detailed description and the accompanying drawings illustrating a preferred embodiment thereof.

Fig. 1 is a fragmentary plan view of the article feeding mechanism;

Fig. 2 is a front elevational view of the mechanism shown in Fig. 1;

Fig. 3 is a perspective view of one of the articles being fed in the present device;

Fig. 4 is a plan sectional view of a portion of the feed mechanism;

Fig. 5 is a vertical longitudinal sectional view of a portion of the feed mechanism with parts thereof shown in one position;

Fig. 6 is a view similar to Fig. 5 with some of the parts shown in different positions;

Fig. 7 is a side elevation of a view of another portion of the feed mechanism;

Fig. 8 is a vertical sectional view taken on the line 8—8 of Fig. 7; and

Figs. 9 and 10 are vertical sectional views taken along the lines 9—9 and 10—10 of Fig. 5.

The present apparatus 14 was designed to feed successive articles 15 from a magazine 16 step by step to a work station 18 (Fig. 1) where a work operation is performed thereon. The article 15 is a switch or relay part having a plurality of straight wires 20 secured in a molded block 21 formed with a pair of laterally projected apertured ears 22 and a transverse groove 23. The articles 15 are stacked on the U-shaped holder 25 with the apertured ears 22 fitting over the parallel rods 26 of the holder which is then inverted and applied to magazine 16 and a weight 27 placed on the upper end of the stack urges the articles 10 downwardly with the lower article of the stack disengaged from the rods and resting on the horizontal platform 28 in alignment with the upper surfaces 30 of a pair of guide rails 31 of the feed mechanism 14. The magazine 16 may be fixed to a base plate 32 as indicated herein or it may be mounted with other magazines on a turret and automatically indexed to remove the empty magazines and supply full ones to an unloading station in alignment with the feeding apparatus. One of the rails 31 is L-shaped and has a laterally projecting portion 34 (Figs. 9 and 10) to which the other rail 31 is secured by screws 35 to form a channel-shaped member with the upper surfaces 30 engageable with the wires 20 of the article 15 for supporting the article. The upper portions of the rails 31 are spaced apart a predetermined distance for receiving the blocks 21 of the article therebetween and holding them against displacement transversely of the guide rails.

A reciprocal sectional feed bar 40 is provided having a lower feed bar section 41 and an upper feed bar section 42 (Fig. 2). The lower feed bar 41 is disposed between the guide rails 31 and below the upper surface 30 thereof and has a feed pawl 44 and a plurality of feed pawls 45 pivotally mounted thereon for reciprocation therewith. The lower feed bar 41 as shown in Fig. 4 is recessed at 46 for receiving the feed pawls 44 and 45 therein and plates 47 are secured to the feed bar by screws 48 to retain the feed pawls against lateral displacement. The feed pawl 44 pivotally mounted on a pin 50 has a long forwardly extending arm 51 and an upwardly extending hook portion 52 engageable with the article 10, and has a downwardly extending arm 53 which is engageable with a stop pin 54 for limiting its rocking movement in one direction. A coil spring 55 supported on a pin 56 on the feed bar 41 moves the feed pawl 44 to its normal upper position shown in Fig. 5. The hook end 52 of the feed pawl 44 has a sloping surface 57 which engages the lowermost article 10 of the stack of articles 10 in the magazine 16 and serves to cam the end 52 downwardly as the feed bar is moved to the left as viewed in Fig. 5 to carry the end 52 of the pawl 44 under and beyond the stack of articles 10 at which time the pawl 44 is restored by the spring 55 to its normal upward position with the end 52 laterally aligned with the lower article 10 of the stack. On the forward or feed stroke of the feed bar of pawl 44 engages the lowermost article 10 and advances it from the magazine 16 onto the guide rails 31.

Each of the feed pawls 45 is pivotally mounted on a pin 63 and has a laterally extending arm 64 with an upwardly extending hook 65 and has a downwardly extending arm 66 provided with a slot 67. Fitting in the slot 67 is one end of a pin 68 which extends through a horizontal slot 69 in the feed bar 41 and is secured to a pawl actuating member or bar 70 for causing the actuation of the feed pawls 45 to and from their upper operative position as shown in Fig. 5 and their lower inoperative position shown in Fig. 6. The bar 70 is channel-shaped having flanges 71 abutting a cooperating bar 72 to which the bar 70 is secured by a plurality of screws 73 (Figs. 5 and 10) to form a composite tubular inertia member 74. The feed bar 41 is recessed at 75 to provide clearance for the screws 73. The inertia member 74 is slidably mounted for reciprocation within the channel formed by the guide rails 31, the upper portions of which overlie portions of the bars 70 and 74 to prevent vertical displacement thereof. The tubular-shaped inertia member 74 also encloses the feed bar 41 and supports it for a limited sliding movement relative thereto. The upper flange 71 of the bar 70 is cut away at 76 to provide clearance recesses for movement of the feed pawls 45.

The inertia member 74 serves to move the feed pawls 45 from one position to another during the initial portion of each movement in opposite directions during the reciprocation of the feed bar 41. If we assume that the feed bar 41 is moving from left to right with the feed pawls 45 in the upper position and that the bar has arrived at the end of its feed stroke as shown in Fig. 5, during the initial movement (¼ inch) in the reverse direction of the feed bar 41 the inertia member 74 by virtue of its weight and frictional engagement with the guide rails 31 will remain stationary until the pins 68 secured thereto are engaged by the right hand ends of the slots 69 in the feed bar 41 at which time the inertia bar is moved with the feed bar. During the ¼ inch initial movement of the feed bar in said reverse direction the pawls 45 are moved therewith and are caused to oscillate about the pivot pins 63 to their lower positions by the temporarily stationary pins 68 of the inertia bar and remain in their lower inoperative position for the remainder of the reverse or return stroke. Thus, during the return stroke of the feed bar the feed pawls 45 are in their lower position and are moved under the articles 10 supporting on the guide rails 31 and at the end of the return stroke the hooks 65 of the feed pawls 45 are disposed below and in spaced relation to the left-hand edge of the articles 10 in the relation indicated in Fig. 6. During the initial portion (¼ inch) of the feed stroke of the feed bar 41 to the right as viewed in Fig. 6 the inertia member 74 remains stationary until the pins 68 are engaged by the lefthand end of the slots 69 in the feed bar 41 during which ¼ inch movement of the feed bar relative to inertia member the feed pawls 45 are oscillated about the pins 67 from their lower position to their upper position in engagement with the lefthand edge of the article 10 and are disposed in the relation shown in Fig. 5 and remain in this position for the remainder of the feed stroke. In the present construction the inertia member 74 because of its weight will insure relative movement between the feed bar and the inertia member during the initial portion of each stroke of the feed bar.

However, if desired the inertia member may be made relatively light and means are provided for yieldably retaining it in a stationary position during the (¼ inch) initial movement of each stroke of the feed bar 41. As shown in Figs. 5, 6, and 9 the underneath side of the bar 70 for actuating the pawls 45 is provided with a pair of recesses 76 in a predetermined spaced relation to each other which are alternately engaged by a detent 77 mounted for vertical movement in a bore 78 and urged upwardly by a spring 79. Thus, the detent engages one of the recesses 76 of the pawl actuating member 70 at the beginning of each movement of the feed bar 41 and serves to yieldably hold it against movement during the initial (¼ inch) movement of each stroke of the feed bar.

The lower feed bar section 41 has an arm 80 secured thereto which extends laterally through a relatively short slot 81 in the inertia bar 72 and a relatively long slot 82 in a guide rail 31 (Figs. 2 and 4). One end of a threaded connector member 84 is connected to the arm 80 and the other end of the member 84 is connected to one end of a C-shaped arm 85, the other end of which is secured to the upper feed bar section 42 (Figs. 1, 2, and 10).

The upper feed bar section 42 is supported for reciprocation on a plurality of rollers 90 which ride in slots 91 in the feed bar 42 and are secured to a stationary supporting bar 92. The bar 92 is secured to the upper ends of a plurality of brackets 93 which are fixed to the base plate 32. A depending tongue 94 on the supporting bar 92 engages the articles 15 in the grooves 23 and serves to prevent upward displacement of the articles and to guide them longitudinally as they are advanced. The upper feed bar 42 has a plurality of feed pawls 96 pivotally mounted thereon and adapted to pivot downwardly therefrom and engage successive articles 10 and advance them step by step in response to the reciprocation of the feed bar 14. A plurality of holding pawls 98 are pivotally mounted in the guide rails 99 and are yieldably urged upwardly to engage the articles and prevent their accidental movement in a reverse direction. The rails 99 form an extension of the guide rails 31 and have upper surfaces 100 forming a continuation of the upper surfaces of the guide rails 31 for supporting the articles 10.

The feed bar 41 is reciprocated through a predetermined stroke by a cam 105 which is driven through a worm and worm wheel drive 106 by a motor 107 (Fig. 1). A cam follower 108 actuated by the cam 105 is carried by a slide 109 slidable in a guideway 110 and is connected to the upper feed 42 by a connector member or bracket 111. The cam 105 is shaped to impart a reciprocating movement through a predetermined distance which includes a complete continuous forward or feed stroke, a ¼ inch movement of the return stroke, a dwell for a predetermined length of time, and the remainder of the return stroke. Thus, the feed bar 40 advances successive articles step by step through predetermined distances to move the successive articles from the magazine 16 to the work station 18 where work is performed thereon, and after each feeding movement the feed bar 40 is retracted ¼ inch and remains in said position for a predetermined period of dwell.

The lower feed bar secion 41 of the feeding apparatus permits articles 10 advanced thereon to be readily removed for inspection and returned thereto.

If desired a removable hold down bar 115 may be provided which is secured to one end of a pair of arms 116, the other ends of which are pivotally connected at 117 to a pair of supporting brackets 118 fixed to a guide rail 31. Stops 119 on the brackets 118 engage the arms 116 to support the hold down bar 115 in a predetermined position in vertically spaced relation to the guide rails 31 and the lower edge of the hold down bar 115 is adapted to engage the articles in the grooves 23 thereof to prevent vertical displacement of the articles and aid in guiding them longitudinally. The guide rail 115 may be swung from its operative position in engagement with the articles 10 when it is desired to remove any of the articles on the open portion of the feed mechanism.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

1. A feed mechanism for advancing articles step by step comprising a channel member having a pair of upwardly directed flanges forming rails for supporting the articles for movement thereon, a feed bar disposed between said rails, a plurality of pawls pivotally mounted thereon in spaced relation to each other, means for reciprocating the feed bar, and an inertia member slidable on said channel member and connected to said feed bar and said pawl for movement with said feed bar and for limited movement relative thereto, said inertia member being operable in response to the initial portion of the movement of the feed bar in one direction for moving the pawls in one direction to raise portions thereof to an operative position engageable with the articles on the supporting rails for advancing them and being operable in response to the initial portion of the movement of said bar in the reverse direction for moving the pawls in a reverse direction to an inoperative position in disengaged relation to said articles.

2. An article feeding mechanism comprising means for supporting articles for movement, a feed bar having a plurality of pawls mounted thereon for movement to an operative position engageable with the articles and to an inoperative position disengaged from the article, means for reciprocating said feed bar, an inertia member operatively connected to said pawls, means mounting said inertia member for movement on the supporting means and for movement with said feed bar and for limited movement relative thereto to effect the movement of said pawls to and from said operative and said inoperative positions, and means for yieldably retaining said member stationary during the initial portion of the movement of said feed bars in opposite directions to effect the actuation of the pawls from one position to another.

3. An article feeding device comprising means for supporting articles for movement through a predetermined path, a reciprocable feed bar having an upper feed bar section disposed above the path of movement of said articles and a lower feed bar section disposed below said path of movement of the articles, pawls mounted on the upper and the lower feed bar sections for advancing said articles step by step in response to reciprocation of said feed bar, means for reciprocating the feed bar, and an inertia member slidable on said supporting means and connected to said feed bar and to said pawls for movement with the feed bar and for limited movement relative thereto, said inertia member being operable in response to the initial portion of the movement of the feed bar in one direction for moving the pawls on the lower feed bar section to an upper position engageable with the articles for advancing them and being operable in response to the initial portion of the movement of the feed bar in the reverse direction for lowering said pawls.

4. In a device of the type described, the combination of a magazine for supporting a stack of articles with the lower article of the stack capable of being removed horizontally therefrom, a pair of laterally spaced supporting rails adjacent the magazine and having upper supporting surfaces horizontally aligned with the lower article in the magazine, means for supporting said rails, a reciprocable feed bar disposed between said rails, a pivoted feed pawl mounted on said feed bar for transferring the lowermost article in the magazine from the magazine onto said supporting rails, a plurality of other feed pawls on said feed bar, and an inertia member slidable on said supporting means and connected to said feed bar and to said pawls for movement with the feed bar and for limited movement relative thereto, said inertia member being operable in response to the initial portion of the movement of the feed bar in one direction for raising said other pawls to an upper position engageable with the articles for advancing them and being operable in response to the initial portion of the movement of the feed bar in the reverse direction for lowering said other pawls for movement with the feed bar below and in spaced relation to the articles.

5. An article feeding mechanism comprising guide means for supporting articles for movement, a feed bar having a plurality of pawls pivotally mounted thereon for oscillating movement to and from an operative position engageable with the articles for advancing them and to and from an inoperative position in spaced relation to said articles, means for reciprocating said feed bar, a pawl actuating member mounted for movement on said guide means and supporting said feed bar, means interconnecting said feed bar and said member for reciprocable movement together and for limited movement of the feed bar relative to the member to effect the movement of said pawls to and from said operative and said inoperative positions, and means for yieldably retaining said member stationary during the initial portion of the movement of said feed bars in opposite directions to effect the actuation of the feed pawls from one position to another.

6. An article feeding mechanism comprising guide means for supporting articles for horizontal movement, a feed bar having a plurality of spaced pawls pivotally mounted thereon for movement to an operative position engageable with the articles for advancing them and to an inoperative position, means for reciprocating said feed bar, an inertia member having pin and slot connections with said pawls, said feed bar having slots for receiving said pins therethrough for establishing a connection therebetween for movement of the inertia member with the feed bar and providing limited movement of the feed bar relative to said inertia member to effect the movement of said pawls to and from said operative and said inoperative positions, and means on said guide means for yieldably retaining said member stationary during the initial portion of the movement of said feed bars in opposite directions to effect the actuation of the feed pawls from one position to another.

7. In an article feeding mechanism, stationary means having surfaces for supporting articles for movement along a predetermined path, a feed bar mounted for reciprocable movement parallel to said path, a feed pawl mounted on the feed bar for pivotal movement, means on the feed bar for limiting the pivotal movement of the pawl in one direction to an operative position with a portion of the pawl in the path of the article and in the opposite direction to an inoperative position with the said portion of the pawl out of the path of the article, means for reciprocating the feed bar, and an inertia member slidable on the stationary means along said predetermined path and connected to the feed pawl for shifting said pawl from one position to the other in response to movement of the feed bar in opposite directions.

8. An article feeding mechanism comprising a stationary U-shaped member having a pair of spaced parallel surfaces for supporting articles for movement along a predetermined path, a feed bar mounted in the U-shaped member for reciprocable movement parallel to said path, a plurality of feed pawls mounted on the feed bar for pivotal movement, means on the feed bar for limiting the pivotal movement of the pawls in one direction to an operative position with portions of the feed pawls in the path of the articles and in the opposite direction to an inoperative position with the said portions of the feed pawls out of the path of the articles, means for reciprocating the feed bar, and an inertia member slidable on the U-shaped member along said predetermined path and connected to the said pawls for shifting the pawls from one position to the other in response to movement of the feed bar in opposite directions.

References Cited in the file of this patent
UNITED STATES PATENTS

| 1,435,046 | Birnstock | Nov. 7, 1922 |
| 1,560,373 | Birnstock | Nov. 3, 1925 |
| 2,771,172 | Bergstrand | Nov. 20, 1956 |